(12) United States Patent
Evans et al.

(10) Patent No.: US 9,156,940 B2
(45) Date of Patent: Oct. 13, 2015

(54) OXYGEN SCAVENGING COMPOSITION

(75) Inventors: Richard H. Evans, Wexford, PA (US); Jeffrey Niederst, Leechburg, PA (US); Paul E. Share, Wexford, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 625 days.

(21) Appl. No.: 12/675,279

(22) PCT Filed: Aug. 26, 2008

(86) PCT No.: PCT/US2008/074314
§ 371 (c)(1),
(2), (4) Date: Feb. 25, 2010

(87) PCT Pub. No.: WO2009/029615
PCT Pub. Date: Mar. 5, 2009

(65) Prior Publication Data
US 2010/0237283 A1    Sep. 23, 2010

Related U.S. Application Data

(60) Provisional application No. 60/968,208, filed on Aug. 27, 2007.

(51) Int. Cl.
| B29D 22/00 | (2006.01) |
| C08G 63/21 | (2006.01) |
| C08G 18/36 | (2006.01) |
| C08K 5/098 | (2006.01) |

(52) U.S. Cl.
CPC ............... *C08G 63/21* (2013.01); *C08G 18/36* (2013.01); *C08K 5/098* (2013.01)

(58) Field of Classification Search
CPC .. C08K 5/098; C08K 2201/012; C08L 67/08; C08L 67/02; C08L 2201/14; C08L 101/02; C08G 18/36; C08G 63/21; B32B 27/18; B32B 2307/74
USPC ....................................................... 428/35.7
See application file for complete search history.

(56) References Cited

U.S. PATENT DOCUMENTS

| | | | |
|---|---|---|---|
| 4,215,179 A | 7/1980 | Melamed et al. | |
| 4,388,926 A | 6/1983 | Shalaby et al. | |
| 4,908,151 A | 3/1990 | Inoue et al. | |
| 5,211,875 A | 5/1993 | Speer et al. | |
| 5,286,407 A | 2/1994 | Inoue et al. | |
| 5,399,289 A | 3/1995 | Speer et al. | |
| 5,529,833 A | 6/1996 | Speer et al. | |
| 5,627,239 A | 5/1997 | Ching et al. | |
| 5,646,236 A | 7/1997 | Schafheutle et al. | |
| 5,660,761 A | 8/1997 | Katsumoto et al. | |
| 5,700,554 A | 12/1997 | Speer et al. | |
| 5,859,145 A | 1/1999 | Ching et al. | |
| 6,083,585 A | 7/2000 | Cahill et al. | |
| 6,187,384 B1 | 2/2001 | Wilke et al. | |
| 6,254,804 B1 | 7/2001 | Matthews et al. | |
| 6,509,417 B1 | 1/2003 | Wetzel et al. | |
| 6,521,717 B1 * | 2/2003 | Itoh ............................... 525/444 |
| 6,527,976 B1 | 3/2003 | Cai et al. | |
| 6,559,205 B2 * | 5/2003 | Cai et al. ........................ 523/332 |
| 6,572,783 B1 | 6/2003 | Cai et al. | |
| 6,596,192 B2 | 7/2003 | Himeshima et al. | |
| 6,863,988 B2 | 3/2005 | Tibbitt et al. | |
| 7,097,890 B1 | 8/2006 | Ching et al. | |
| 7,238,300 B2 | 7/2007 | Solis et al. | |
| 7,294,671 B2 | 11/2007 | Bheda et al. | |
| 7,479,326 B2 | 1/2009 | Share et al. | |
| 2003/0012896 A1 | 1/2003 | Ching et al. | |
| 2003/0152727 A1 | 8/2003 | Jerdee et al. | |
| 2003/0157283 A1 | 8/2003 | Tai et al. | |
| 2005/0059796 A1 | 3/2005 | Bastioli et al. | |
| 2005/0085577 A1 | 4/2005 | Ching et al. | |
| 2006/0202161 A1 * | 9/2006 | Share et al. .............. 252/188.28 |
| 2009/0311457 A1 | 12/2009 | Share et al. | |
| 2010/0247821 A1 | 9/2010 | Evans et al. | |

FOREIGN PATENT DOCUMENTS

| | | | |
|---|---|---|---|
| DE | 122986 | 11/1976 | |
| EP | 1216841 A2 * | 6/2002 | ............... B41M 7/00 |
| JP | 61185571 | 8/1986 | |
| JP | 62116623 A | 5/1987 | |
| JP | 2001031759 | 2/2001 | |
| WO | 9912829 A1 | 3/1999 | |
| WO | 01/27181 | 4/2001 | |
| WO | 0236670 A1 | 5/2002 | |

OTHER PUBLICATIONS

The International Search Report and Written Opinion dated Jan. 6, 2009 for corresponding International Application No. PCT/US08/74314 (9 pages).
The International Search Report and Written Opinion dated Dec. 4, 2008 for International Application No. PCT/US08/74302 (7 pages).
Lange, J., et al., Barrier coatings for flexible packaging based on hyperbranched resins, Polymer 42 (2001), 7403-7410, Elsevier Schience Ltd. (8 pages).
Gao, C., et al., Hyperbranched polymers: from synthesis to applications, Prog. Polym. Sci. 29 (2004), 183-275, Elsevier Ltd. (93 pages).
Heaton, F. W., et al., The aerobic oxidation of unsaturated fatty acids and their esters: cobalt stearate-catalyzed oxidation of linoleic acid, J. Lipid Research, Apr. 1961, vol. 2, No. 2, Ministry of Agriculture, Fisheries and Food, Food Science and Atomic Energy Division, Aberdeen, Scotland.
Office Communication dated Jan. 5, 2011 for U.S. Appl. No. 12/334,227 (19 pages).

* cited by examiner

Primary Examiner — James Yager

(57) ABSTRACT

An oxygen-scavenging composition is provided that includes an oxygen-scavenging polymer and a catalyst. The oxygen-scavenging polymer, which in preferred embodiments is suitable for use in packaging articles, includes a base polymer having a backbone, and an unsaturated side chain attached to the backbone. In one embodiment, the side chain comprises an unsaturated fatty-acid.

16 Claims, No Drawings

OXYGEN SCAVENGING COMPOSITION

CROSS REFERENCE TO RELATED APPLICATION

This application is the National Stage filing under 35 U.S.C. 371 of International Application No. PCT/US2008/074314 filed on Aug. 26, 2008, which claims priority to U.S. Provisional Application No. 60/968,208 filed on Aug. 27, 2007, the disclosures of which are incorporated herein by reference in their entirety.

TECHNICAL FIELD

This invention relates to an oxygen-scavenging polymer. The polymer may be applied to a package, or made into packaging, wrapping and storage articles to preserve the freshness of, for example, foods and beverages.

BACKGROUND

Plastic materials can be used in a wide variety of packaging, wrapping, and storage articles. Plastic materials traditionally have not had good barrier properties to gases (particularly oxygen). Plastics have generally functioned poorly at excluding oxygen passage compared with other available materials, such as glass or metal. However, despite this shortcoming, some plastic materials have become widely used for some packaging applications. For example, polyethylene terephthalate (PET) has become widely used for soft drink bottles, water bottles, and the like. However, the barrier properties of PET have limited its use for other applications in which the package contents are more susceptible to degradation from exposure to oxygen. For example, glass still predominates in juice and beer bottling.

To reduce gas transmission of a plastic packaging material, a passive barrier may be used to hinder the passage of a gas, e.g. oxygen. For example, in a multi-layer bottle, the inner and outer layers may be made of PET, while the center layer is a different material with passive barrier properties such as, for example, ethylene vinyl alcohol (EVA). However, layers of dissimilar materials often do not adhere well to one another, and an adhesive between the layers may be required to prevent delamination. The clarity of the packaging material may be reduced when a passive barrier material is used, and the multi-layered material may be more difficult to recycle.

An active oxygen-scavenging system, which reduces or depletes the oxygen in an environment, may be used to overcome at least some of the limitations of a passive barrier system. An active oxygen scavenger, such as a polyamide or a polyolefin, may be incorporated into the backbone of a base polymer material making up the walls of the package to form an oxygen-scavenging polymer. The oxygen-scavenging polymer may be used in a blend with other polymers, or as an oxygen-scavenging layer in a multi-layer container. However, since the oxidation occurs in the backbone of the polymer, the properties of the oxygen-scavenging polymer may change compared to the unmodified base polymer. As a result of the oxidation, the polymer may even begin to degrade over time. Polyamide systems often yellow due to oxidation, and this oxidation may occur during injection molding of the original articles, during storage, use, or during recycling.

What is needed in the marketplace is an improved oxygen-scavenging polymer for use in articles such as packaging, wrapping and storage articles.

SUMMARY

In formulating an oxygen-scavenging polymer, the challenge for the package designer is to balance barrier properties, clarity, recyclability, and cost, while preserving as many of the beneficial properties of the unmodified base polymer as possible.

In one aspect, the invention is an oxygen-scavenging polymer including a base polymer suitable for use in packaging applications, such as for example, a polyester, a polyurethane, a polyepoxide, or a polyamide, which has attached to its backbone an unsaturated side chain, more preferably a side chain with two or more carbon-carbon double bonds.

In another aspect, the invention is an oxygen-scavenging polymer composition including the oxygen-scavenging polymer and an oxidation catalyst.

In yet another aspect, the invention is a solution or a dispersion including the oxygen-scavenging polymer and/or composition and a suitable solvent. The solution or dispersion may be applied, for example, as a coating for packaging articles.

In yet another aspect, the invention is a packaging material including the oxygen-scavenging polymer and/or composition. The packaging material may include the oxygen-scavenging polymer and/or composition as a blend with other polymers in a single layer package such as a bottle or a film. Alternatively, the oxygen-scavenging polymer and/or composition may be used alone or as a blend with other polymers in one or more layers in a multi-layered package such as a bottle or a film.

In yet another aspect, the invention is a method for making the oxygen-scavenging polymer including: (i) reacting a polyol with an unsaturated fatty acid to form a fatty-acid diol adduct; (ii) reacting the fatty-acid diol adduct with either a di-acid compound to form a polyester polymer or a di-isocyanate compound to form a polyurethane polymer; and (iii) blending the polymer with a catalyst.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in description below. Other features, objects, and advantages of the invention will be apparent from the description and drawings, and from the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.).

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "carbon-carbon double bond" means a double bond between two carbon atoms, but excludes the double bonds of an aromatic ring.

As used herein, the term "oxygen-scavenging" means absorbing, consuming, or reducing the amount of oxygen from a given environment.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.).

DETAILED DESCRIPTION

In one aspect, the invention provides an oxygen-scavenging polymer composition. The oxygen-scavenging polymer includes a base polymer (e.g., a polymer preferably suitable for packaging applications) that is modified with an unsaturated side chain attached to its backbone. In preferred embodiments, the unsaturated side chain has two or more carbon-carbon double bonds, and the side chain enhances the oxygen-scavenging capacity of the polymer compared to its unmodified base form.

In one embodiment, the oxygen-scavenging polymer composition includes a polymer backbone and an unsaturated fatty-acid-based side chain, preferably a poly-unsaturated fatty-acid-based side chain attached to the backbone.

The backbone of the oxygen-scavenging polymer may have different configurations depending upon the type of monomer block used in the polymerization of the base polymer material for the packaging product. Different monomer blocks may be chosen depending on the intended application, including the desired properties of the final product, the expected use of the polymer composition, the other materials with which the polymer composition will be mixed or come into contact, or the type of polymer desired.

Suitable polymer backbones include, for example, polyesters and copolyesters (e.g., polyethylene terephthalate ("PET"), polybutylene terephthalate ("PBT"), polyethylene naphthalate ("PEN"), polybutylene naphthalate ("PBN")); polycarbonates; poly(ethylene oxides); poly(epsilon-caprolactams); thermoplastic fluoropolymers (e.g., polytetrafluoroethylenes); polyurethanes; polyepoxides; polylactones such as polycaprolactone; polymethyl methacrylates; polystyrenes; polyarylates; polyphenylene oxides; styrene/maleic anhydrides; polyoxymethylenes; polyamides such as nylon 6, nylon 6,6, nylon 11, nylon 6,12 and nylon 12; imides such as polyimide, polyetherimide and polyamideimide; polyphthalamides; sulfones such as polysulfone, polyarylsulfone, and poly ether sulfone; polyaminoacids; polydimethylsiloxanes; polyolefins such as polyethylene, polypropylene, polybutylene, and polybutadiene; styrenes such as polystyrene, poly α-methyl styrene and styrene/acrylonitrile; vinyls such as polyvinyl chloride and polyvinylnaphthalene; ketones such as polyetheretherketone and polyaryletherketone; mixtures thereof; and derivatives thereof which preferably do not unsuitably interfere with oxygen scavenging.

A polymer backbone that contains one or more heteroatoms (e.g., oxygen, nitrogen, silicon or sulfur) is preferred for some end uses. A polyester backbone is particularly preferred. If desired, the backbone may itself contain one or more carbon-carbon double bonds, one or more aromatic groups, or both.

In one embodiment, the oxygen-scavenging polymer has at least one structural unit represented by schematic formula (I):

In schematic formula I,
-[BACKBONE]- depicts a segment of a polymeric backbone, wherein the segment includes an atom capable of linking to a side chain;

X depicts a divalent organic linking group;

Y depicts a divalent oxygen-scavenging group; and

Z depicts hydrogen or a monovalent organic group.

In formula I, suitable X linking groups include ester, amide, urethane, ether, urea, carbonate ester (—O—C(=O)—O—), and hydrocarbyl (e.g., alkyl) linking groups. Ester and amide linking groups are presently preferred. Suitable Y oxygen-scavenging groups include conjugated and non-conjugated alkenyl groups, more preferably alkenyl groups having two or more carbon-carbon double bonds. If desired, the alkenyl group may be linear or branched, with the carbon-carbon double bonds being on either the backbone of the Y group, or on a branch of the Y group, or both.

In one preferred embodiment of formula I, the Y group comprises the formula —W—C($R_1$)=C($R_2$)—C($R_3R_4$)—C($R_5$)=C($R_6$)—, wherein W, if present, is a divalent organic group. In another preferred embodiment, the Y group comprises the formula —W—C($R_1$)=C($R_2$)—C($R_5$)=C($R_6$)—, wherein W, if present, is a divalent organic group.

In another embodiment, the polymeric backbone is a polyester polymer, X is an —O—(C=O)— linking group, and Y comprises —W—C($R_1$)=C($R_2$)—C($R_3R_4$)—C($R_5$)=C($R_6$)— or —W—C($R_1$)=C($R_2$)—C($R_5$)=C($R_6$)—, wherein W, if present, is a divalent organic group.

In the above embodiments, the R groups (i.e., $R_1$ to $R_6$) preferably each denote one of a hydrogen atom, a substituted or unsubstituted alkyl group, a substituted or unsubstituted cycloalkyl group, a substituted or unsubstituted aryl group, or a substituted or unsubstituted alkenyl group. Each R group preferably has less than 20 carbon atoms, more preferably less than 10 carbon atoms, and most preferably will denote a hydrogen atom.

In formula I, the —X—Y—Z side chain preferably has a molecular weight from about 67 to 1,000, more preferably from about 99 to 500, and most preferably from about 99 to 400. In one embodiment, the —X—Y—Z side chain has a molecular weight of about 280.

In certain preferred embodiments of formula I, the —X—Y—Z side chain is formed using as a feedstock one or more mono- or polyunsaturated fatty acid molecules, preferably one or more polyunsaturated fatty acids. Suitable fatty acids include mono-unsaturated fatty acids such as arichidonic, erucic, oleic, palmitoleic, and ricinoleic acid; and polyunsaturated fatty acids such as licanic, linolenic, eleostearic, linoleic, and conjugated linoleic acid. Preferred fatty acids include licanic, linolenic, eleostearic, linoleic, and conjugated linoleic acid. If desired, combinations of these fatty acids, combinations of these fatty acids together with saturated fatty acids, and the like may be used.

An advantage of using a fatty acid-based feedstock is their relatively low cost and general availability. Other useful fatty acids may include mixtures of saturated and unsaturated fatty acids such as, for example, fatty acids from natural or modified oils such as linseed oil, soybean oil, sunflower oil, safflower oil, castor oil, tung oil, oiticica oil, fish oil, tall oil, cotton seed oil, and mixtures thereof.

A fatty acid may conveniently be incorporated into a polymer through several different methods. The methods may include, for example, providing a preformed polymer and reacting a fatty acid with the preformed polymer or preparing a polymer from reactants including a fatty acid.

In one embodiment, the oxygen-scavenging polymer is made by: (i) reacting a polyol with an unsaturated fatty acid to form a fatty-acid diol adduct; and (ii) either (a) using the fatty-acid diol adduct as a scavenger, or (b) mixing the fatty-acid diol adduct with a suitable polymer, or (c) reacting the fatty-acid diol adduct with a di-acid compound to form a polyester polymer.

For example, a polyol (e.g., a triol such as trimethanol propane (TMP)) may be reacted with a suitable fatty acid (e.g., linoleic acid) to form a fatty-acid diol adduct. This adduct may then be (a) used as an oxygen scavenger composition, or (b) blended with another suitable polymer (e.g., PET) to form an oxygen scavenging polymer composition, or (c) reacted with a suitable di-acid (e.g., adipic acid or isophthallic acid) to form an oxygen-scavenging polymer composition. When the fatty-acid diol adduct is formed for later reaction with a di-acid to form a polyester, it is preferable to control the stoichiometry of the reaction so as to obtain the desired adduct and polymer. In general, to form the fatty-acid diol adduct, the polyol is reacted with the fatty acid in a ratio of one mole of the polyol (N molar equivalents of OH) to a maximum of about N-2 moles of the fatty acid.

In another embodiment, the oxygen-scavenging polymer is made by: (i) reacting a polyol with an unsaturated fatty acid to form a fatty-acid diol adduct; and (ii) reacting the fatty-acid diol adduct with a di-isocyanate compound to form a polyurethane polymer.

In another embodiment, the oxygen-scavenging polymer is made by: (i) providing a polymer with one or more hydroxyl reactive sites; and (ii) reacting a fatty-acid compound (e.g., a fatty acid or a fatty acid contained in another compound such as, for example, a prepolymer) with the hydroxyl site(s), to form a polymer having one or more attached fatty-acid-based side chains. In another embodiment, the oxygen-scavenging polymer is made by: (i) providing a polymer with one or more —NCO reactive sites; and (ii) reacting a fatty-acid compound with the —NCO site(s), to form a polymer having one or more attached fatty-acid-based side chains.

In another embodiment of formula I, the —X—Y—Z side chain is formed using as a feedstock a polybutadiene compound. For example, certain polybutadiene compounds are commercially available as diols. Those materials may be capped on one side with a suitable capping agent (e.g., acetic acid) and capped on the other side using a suitable diacid (e.g., isophthalic acid). The resulting acid terminated polybutadiene compound may then be reacted with a suitable triol as previously discussed and then incorporated into a polymer as previously discussed. As will be appreciated in the art, this particular method of incorporating a polybutadiene side chain into a polymer is only one such method and the present invention is not so limited.

Although not intending to be bound by any theory, it is believed that the active oxygen-scavenging ability of the oxygen-scavenging polymer is based on the carbon-carbon double bonds in the side chains of the polymer, which are exposed and available for oxidation.

In some embodiments, the carbon-carbon double bonds on the side chains in the oxygen-scavenging polymer are in large part responsible for its oxygen-scavenging properties. Consequently, in these embodiments, the number of unsaturated side chains present in the polymer is an important factor in determining its oxygen-scavenging capacity. A sufficient number of side chains should preferably be present for the polymer and/or composition to perform adequately, and for a suitable length of time. In some embodiment of the present invention, the reactivity rate of the oxygen-scavenging side chains may be adjusted to tailor the oxygen-scavenging properties of the composition. For example, a portion of the side chains may be of a first higher reactivity rate (thereby promoting fast initial oxygen scavenging) and a second portion of the side chains may be of a second lower reactivity rate (thereby promoting more prolonged scavenging). The reactivity rate may be increased, for example, by using side chains having pre-conjugated double bonds. The reactivity rate may also be increased, for example, by using side chains having one or more carbon-carbon double bonds modified with a cyclopentadiene compound. For example, a conjugated diene compound (e.g., a cyclopentadiene compound) may be reacted with a carbon-carbon double bond of the polymer via a Diels-Alder reaction to form a strained group (e.g., a norbornene group) capable of scavenging oxygen. For discussion of such modifications see, for example, U.S. Provisional Application 60/910,866 by Share et al. filed on Apr. 10, 2007.

While adding more side chains generally increases the oxygen-scavenging ability of the oxygen-scavenging polymer, increasing the number of side chains generally also begins to alter the quality and characteristics of the polymer compared to its unmodified base form. For example, adding too many side chain monomers may, in some embodiments, cause the resulting oxygen-scavenging polymer to have an undesirably low glass transition temperature ($T_g$), melting point, or physical properties compared to an unmodified base polymer without the side chains. For example, in some embodiments it has been found that when the side chain monomers present in the oxygen-scavenging polymer approach about 60% by weight, the polymer may start to become more rubbery compared to the unmodified base polymer. In addition, for example, if the side chains are too large, the oxygen-scavenging polymer may begin to plasticize and/or agglomerate. In preferred embodiments, the side chains constitute between about 1 and 60 weight percent ("wt-%") of the oxygen-scavenging polymer. More preferably, the side chains constitute between about 2 and 40 wt-% of the oxygen-scavenging polymer, and most preferably the side chains constitute between about 10 and 20 wt-% of the oxygen-scavenging polymer. In other embodiments, such as for example when the oxygen-scavenging polymer is present as a liquid, it may be desirable to have the side chains constitute between about 40 and about 90, more preferably between about 50 and about 80, and most preferably between about 60 and about 70 wt-% of the oxygen-scavenging polymer.

As the properties of the oxygen-scavenging polymer can change based on the percentage and size of the side chains present, it is important to monitor the physical properties of the polymer. For example, increasing the amount of branching in the backbone of the oxygen-scavenging polymer, or increasing the number and/or the size of side chains present in the oxygen-scavenging polymer beyond a certain level may result in changes in viscosity. Many manufacturing processes are optimized and constructed to operate within certain viscosity and temperature ranges, and changing these physical properties can increase processing costs. Thus, the side chains are preferably present in an amount sufficient such that the viscosity remains in the desired target range.

For example, when used with other polymers, such as in certain embodiments including a blend of solid materials, the viscosity of the oxygen-scavenging polymer (when a solid material) is preferably similar to that of the other polymer(s) in the blend. Or, if a multi-layer packaging article is to be produced, the size and number of side chains may make the oxygen-scavenging polymer increasingly different from the other layers. This can decrease the clarity of the final product, and may cause the layers of the resulting article to separate from one another.

In addition to the oxygen-scavenging side groups that contain carbon-carbon double bonds, the oxygen-scavenging polymer can also include one or more additional oxygen-scavenging groups, which may be any suitable type of oxygen-scavenging group, and which may be on the polymer backbone or, even more preferably, on a side chain attached to the backbone. Examples of additional oxygen-scavenging groups may include polyamide groups (e.g., groups formed via polymerization of adipic acid and metaxylene diamine), and any other suitable oxygen-scavenging group.

An optional oxidation catalyst is preferably present with the oxygen-scavenging polymer to form an oxygen-scavenging polymer composition. The oxidation catalyst preferably enhances the oxygen-scavenging properties of the oxygen-scavenging polymer by catalyzing an oxygen-scavenging reaction with the side chains attached to the polymer backbone. While not wishing to be bound by any theory, the oxidation catalyst is believed to assist in activating the double bond(s) of the side chains of the oxygen-scavenging polymer to facilitate a reaction with oxygen.

A broad variety of metallic and organic compounds can catalyze the oxygen-scavenging effect, and an appropriate compound may be selected based on any of cost, compatibility with the oxygen-scavenging polymer, compatibility with other polymers in a blend, and compatibility with other layers in a multi-layered package. Suitable oxidation catalysts include transition metals, complexes of transition metals, photoinitiators, combinations therefore, and the like.

Examples of suitable transition metal catalysts or complexes include iron, iron oxide, cobalt, cobalt oxide, cobalt chloride, nickel, aluminum, aluminum carbide, aluminum chloride, ruthenium, rhodium, palladium, palladium on alumina, antimony, antimony oxide, antimony tri-acetate, antimony chloride III, antimony chloride V, osmium, iridium, and platinum, platinum on alumina, copper, copper oxide, manganese, zinc, or complexes and combinations thereof. Preferred catalysts include salts of cobalt and long chain acids of cobalt such as, for example, cobalt neodecanoate, cobalt stearate, and cobalt octoate.

Mixed metal nanoparticles may also be suitable as a catalyst. Suitable nanoparticles typically have an average particle size of less than about 200 nm, preferably less than about 100 nm, and more preferably between 5 and 50 nm.

Examples of suitable photoinitiators include, but are not limited to, benzophenone, o-methoxybenzophenone, acetophenone, o-methoxy-acetophenone, acenaphthenequinone, methyl ethyl ketone, valerophenone, hexanophenone, alpha-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, alpha-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, alpha,alpha-diethoxyacetophenone, alpha,alpha-dibutoxyacetophenone, etc. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone]. Blends of photoinitiators may also be used.

Generally, photoinitiators must be activated to function most effectively. Photoinitiators may be activated using various types of radiation. For example, the radiation used can be actinic, e.g. ultraviolet or visible light having a wavelength of about 200 to 750 nanometers (nm), and preferably having a wavelength of about 200 to 400 nm. When employing ultraviolet and/or visible light, it is preferable to expose the composition to at least 0.1 Joules per gram of composition. A typical amount of exposure is in the range of 10 to 100 Joules per gram. Another suitable type of radiation that can be used is an electron beam, having a suitable dosage from about 0.2 to about 20 megarads, preferably from about 1 to about 10 megarads. Other possible types and sources of radiation include ionizing radiation such as gamma, x-rays and corona discharge. The radiation exposure is preferably conducted in the presence of oxygen. The duration of exposure depends on several factors including, but not limited to, the amount and type of photoinitiator present, thickness of the layers to be exposed, amount and type of other components present, and the wavelength and intensity of the radiation source.

The oxidation catalyst is preferably present in an amount sufficient to catalyze the oxygen-scavenging ability of the oxygen-scavenging polymer. The amount used will typically depend partially upon the catalyst chosen. However, in general, when using transition metal catalysts or complexes, the amount of transition metal catalyst or complexes present may suitably be greater than about 10 ppm by weight, preferably greater than about 100 ppm by weight, and more preferably greater than about 300 ppm by weight of the total composition. The amount of transition metal catalyst or complexes present may suitably be less than about 10,000 ppm by weight, preferably less than about 1,000 ppm by weight, and more preferably less than about 600 ppm by weight of the total composition. In some embodiments, a suitable amount of residual transition metal catalyst or complexes may be present in another polymer material (e.g., PET) that is combined with the oxygen-scavenging polymer. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

The oxidation catalyst can be added at different times, forming the oxygen-scavenging polymer composition. Suitable locations for addition of an oxidation catalyst include, for example, adding the catalyst into the reactor during polymerization or extruder during reactive extrusion, adding the catalyst as the polymer is optionally ground or formed into pellets, or adding the catalyst together with the polymer composition during the article production process.

Another aspect of the present invention is an article including an oxygen-scavenging polymer or oxygen-scavenging polymer composition. Articles, including but not limited to, bottles, cups, bowls, containers, films, wraps, liners, coatings, trays, cartons, and bags for industrial, commercial, or residential use may be formed and produced. The articles may be formed by using the oxygen-scavenging polymer and/or composition alone, by using a blend of the oxygen-scavenging polymer and/or composition with one or more other polymers, or by using a multi-layer construction incorporating one or more layers including the oxygen-scavenging polymer and/or composition. Additionally, the oxygen-scavenging polymer and/or composition may be used as a coating, as a lining, or as part of a blend for a coating or lining of another article, such as a can, bottle, or container coating or lining.

If desired, the oxygen-scavenging polymer composition may be dissolved in a suitable solvent to form a coating solution, or may be blended with water and/or a suitable solvent to form a coating dispersion. The coating solution or dispersion may be applied using known methods, e.g. spraying, onto a surface of a packaging article and dried to form an oxygen-scavenging coating. The coating dispersion may be applied between layers of another suitable polymer to form an oxygen-scavenging film.

Alternatively, the oxygen-scavenging polymer composition may be blended with another compatible polymer to form an oxygen-scavenging article, or may be used as an oxygen-scavenging layer in a multi-layered package construction.

In one embodiment, the invention provides a single-layer article comprising an oxygen-scavenging polymer. A single-layer article is an article formed of substantially the same composition throughout. For example, the article may be produced using only the oxygen-scavenging polymer composition, or it may be produced using a blend of the polymer composition with one or more other polymers. For example, a single-layer bottle would typically be produced using a blend of up to about 15% of the oxygen-scavenging polymer composition and 85% of another polymer suitable for packaging applications, such as PET, PEN, and the like. The amount of oxygen-scavenging polymer included may vary in certain applications depending upon various factors such as, for example, the efficacy of the oxygen-scavenging polymer, cost, and the desired effect. In general, a single-layer article will typically include at least about 0.1 wt-%, more preferably at least about 0.5 wt-%, and even more preferably at least about 1.0 wt-% of the oxygen-scavenging polymer(s). A single-layer article will typically include less than about 15 wt-%, more preferably less than about 10 wt-%, and even more preferably less than about 6 wt-% of the oxygen-scavenging polymer(s).

Compatible polymers should be selected if a blend is prepared. Preferably, a polymer will be selected that has similar viscosity and similar characteristics to the oxygen-scavenging polymer and/or composition. If a blend is used, the blend may be formed at any point, but preferably will be formed during the article production process. The oxygen-scavenging polymer and/or composition and a compatible polymer may be fed separately into the article production process, and then blended during the process before being formed into the desired article. For example, the separate polymers may be fed into an injection molder, and the components will melt and blend in the screw of the injection molder. Then, the combination will jointly be formed into the produced article. The single-layer article will scavenge oxygen passing through the material, oxygen within the container during filling or storage, as well as oxygen at the outside surface.

For example, a polyester-based polymer composition may be blended with another polymer, having similar viscosities and other properties to enable a high degree of mixing and increase the consistency of the final article. Examples of suitable polyester resins include, but are not limited to, polyethylene terephthalate (PET), polybutylene terephthalate (PBT), polyethylene naphthalate (PEN), and polybutylene naphthalate (PBN). The appropriate polymer will be selected to provide the desired final article properties. Additionally, factors such as blend compatibility, resulting physical characteristics of the blend, and amount of the oxygen-scavenging polymer composition included in the blend will be considered.

A multi-layer product may be produced that includes the oxygen-scavenging polymer and/or composition. A multi-layer product may benefit from placing a layer of another material between the atmosphere and the oxygen-scavenging polymer and/or composition. An outer layer will usually protect the oxygen-scavenging polymer and/or composition from physical damage, and also assist in blocking some atmosphere and oxygen. The oxygen-scavenging polymer and/or composition will preferably scavenge oxygen that penetrates the outer layer, or is present inside the container during filling or storage. Therefore, an additional outside layer may be beneficial in extending the effectiveness of the article, while maintaining other desirable properties.

The compatibility of the materials used is an important consideration for a multi-layer article. If the materials are not compatible, the layers may separate or the material may appear cloudy or hazy. Layer separation could lead to failure of the article, decrease clarity even further, degrade the strength or resilience of the article, change the functionality, and might lead to premature exhaustion of the oxygen-scavenging polymer composition. Appropriate adhesives or other materials may be required for use between layers to maintain article integrity, which may lead to increased costs, manufacturing challenges, and may impact recycling. Therefore, the layers will preferably be compatible if a multi-layer article is produced. For example, polymers having similar physical properties such as a viscosity and Tg may be used in conjunction with the oxygen-scavenging polymer and/or composition.

Any suitable amount of one or more oxygen-scavenging polymers sufficient to provide the desired effect may be included in one or more layers of a multi-layer article. The total amount of oxygen-scavenging polymer(s) included in a multi-layer article, based on the total weight of the article, may be similar in some embodiments to that described above for single-layer articles. The concentration of oxygen-scavenging polymer(s) present in a barrier layer of a multi-layer article will typically be higher than that of a single-layer article.

An oxygen-scavenging polymer may be formed using a wide range of processes, including, for example, reactor polymerization and reactive extrusion.

Reactor polymerization includes batch and continuous processing. Various components may be charged into a reactor, and the reaction conditions set. After suitable reaction time, the composition may be removed.

In reactive extrusion, the components may be fed into the mixing zone of the extruder. The components may be mixed together before feeding into the extruder, or may be fed separately. Preferably, the components will be fed separately. As part of the extrusion process, the components will be subjected to elevated temperature, pressure, and shear as the components travel through the extruder. This process mixes the components, and also causes the components to react, forming the polymer composition.

For example, a polyester may be formed using one or more polyols and one or more diacids.

Suitable diacids include dicarboxylic acid components such as, but not limited to, terephthalic acid, isophthalic acid, naphthalic acid, 2,6-naphthalene dicarboxylic acid, other naphthalene dicarboxylic acid isomers, mixtures of dicarboxylic acid components, and derivatives thereof. The dicarboxylic acid components may be present as derivatives, such as, for example, bis-hydroxyethyl terephthalate. Similarly, other suitable components may be selected and used in forming other types of polymers such as polyamide, polyepoxy, and polyurethane polymers.

Suitable polyols include, but are not limited to, aliphatic alcohols, cycloaliphatic alcohols, difunctional alcohols ("diols"), trifunctional alcohols ("triols"), tetrahydric or higher alcohols, and combinations thereof. Examples of some suitable polyols include ethylene glycol, propylene glycol, butylene glycol, neopentyl glycol, cyclohexane diol, cyclohexane dimethanol, hexane diol, glycerine, trimethylol propane ("TMP"), di trimethylolpropane, pentaerythritol, dipentaerythritol, trimethylol ethane, trimethylol butane substituted propane diols and triols (e.g., 2-methyl, 1,3-propane diol), substituted butane diols and triols, substituted pentane diols and triols, substituted hexane diols and triols, diethylene glycol and triols, derivatives thereof, and mixtures thereof.

A polymerization catalyst is preferably used to promote the polymerization reaction. Suitable polymerization catalysts include transition metal catalysts such as manganese, iron, antimony, or titanium. The transition metal catalyst is preferably added in an amount sufficient to catalyze the polyester reaction. The amount of polymerization catalyst present may suitably be greater than about 10 ppm by weight, preferably greater than about 100 ppm by weight, and more preferably greater than about 200 ppm by weight, based on the total weight of the reaction mixture. The amount of polymerization catalyst present may suitably be less than about 2,000 ppm by weight, preferably less than about 1,500 ppm by weight, and more preferably less than about 1,200 ppm by weight. In addition, a catalyst activator, such as, for example, phosphoric acid may be used with the polymerization catalyst.

A wide variety of additional components may be present in the polymer composition of the present invention without detracting from its oxygen-scavenging properties, and this may be particularly important when recycled resins, such as recycled polyesters, are used. Suitable optional additional components or additives include heat stabilizers, antioxidants, colorants, crystallization agents, blowing agents, fillers, accelerants, and the like. Preferably, an anti-oxidant, such as BHT, will be added, as the anti-oxidant enhances the stability of the oxygen-scavenging composition during processing.

The resulting polymer composition can be used in forming articles, may be stored, or may be sent for further processing. Possible further optional processing steps include pelletization and solid stating.

In pelletization, the polymer composition is chopped or ground into small pieces or flakes. Other components may also be added during this process.

Solid stating refers to a process in which a polymer is formed, and when the polymerization reaches a certain point (or a certain viscosity is reached) the polymerization is temporarily stopped. At this point, polymer pellets are formed, as the polymer is still able to be handled and processed relatively easily. The polymer pellets are then fed into a rotary vacuum dryer (available from Stokes Vacuum Inc.). The rotary vacuum dryer incorporates temperature control for heating, and has a tumbler to keep the pellets loose and free flowing. The pellets are introduced, tumbling is begun, and heat is introduced. This causes the polymerization reaction to continue within the pellets. This continued reaction forms higher molecular weight polymers, which are more useful than polymers of lower molecular weight in many applications. Because the polymerization continues and molecular weight increases within the pellets, handling and processing remains the same. Solid stating may be used in conjunction with any of the methods used for forming the polymer composition.

Presently preferred oxygen-scavenging polymers have a number average molecular weight of 500 to 25,000, more preferably from 1,000 to 15,000 and most preferably from 2,000 to 10,000.

Appropriate care should preferably be used when handling and storing the oxygen-scavenging polymer, particularly after the oxidation catalyst has been added to form the oxygen-scavenging composition. Specifically, exposure to oxygen is preferably minimized until use. Therefore, production and storage of the composition under conditions eliminating or minimizing oxygen are preferred. For example, the composition may be stored in well-sealed containers, or under an inert atmosphere such as nitrogen, until use.

Tests of an oxygen-scavenging polymer composition may be conducted by various methods. Oxygen content of a gas sample may be analyzed by the Ocean Optics Foxy Oxygen Sensor System (available from Ocean Optics, Dunedin, Fla.). This system uses fluorescence and quenching to measure oxygen content.

In order to test the viscosity of the oxygen-scavenging polymer, various viscosity tests may be employed. One testing scheme, solution viscosity, is carried out via dissolving an amount of the oxygen-scavenging polymer composition in an appropriate solvent. Another testing scheme is melt viscosity, using a Dynisco or other capillary rheometer may be used. This test is conducted following ASTM D3835-96 "Standard Test Method for Determination of Properties of Polymeric Materials by Means of a Capillary Rheometer." This test is conducted by testing the viscosity of the composition in a liquid form. Preferably, a melt viscosity test will be used, as the viscosity that is important is the viscosity of the material during manufacturing, or the viscosity in the molten state.

EXAMPLES

The invention is further illustrated in the following non-limiting examples, in which all parts and percentages are by weight unless otherwise indicated.

Example 1

Linoleic Acid/Trimethylol Propane Adduct

To a 4 neck round bottom flask equipped with a mechanical stirrer, a packed column, a Dean-Starke trap, a condenser, and a thermocouple connected to a temperature control device, was added 1762.7 parts of linoleic acid, 737.3 parts trimethylol propane, and 2.5 parts Fastcat 4201. This was heated to 210° C. over the course of 90 minutes. After about 60 minutes into the heat up, water started coming over and the temperature was 166° C. After another 70 minutes at 210° C., about 84 parts of reaction water were obtained. After heating another 80 minutes the batch had an acid number of 3, and a hydroxyl number of 243.7. The mixture was cooled and discharged.

Example 2

Polyester Made from Adipic Acid and Example 1 Adduct

To a 4 neck round bottom flask equipped with a mechanical stirrer, a packed column, a Dean-Starke trap, a condenser, and a thermocouple connected to a temperature control device, was added 2363.6 parts of the adduct described in Example 1, 678.3 parts adipic acid, and 3.0 parts Fastcat 4201. This was heated to 210° C. over the course of 2.5 hours. After about 60 minutes into the heat up, water started coming over and the temperature was 172° C. After 6 hours total at 210° C. the batch had an acid number of 3.7, and a hydroxyl number of 44.9. The mixture was cooled and discharged at 150° C.

Example 3

Isophthalic Acid ("IPA") Capping of Example 1 Adduct

To a 4 neck round bottom flask equipped with a mechanical stirrer, a packed column, a Dean-Starke trap, a condenser, and a thermocouple connected to a temperature control device, was added 883.5 parts of the adduct described in Example 1, 616.5 g of isophthallic acid, and 1.5 g of Fastcat 4201. The material was heated to 220° C. over the course of 1 hour. After heating for 6 hours, the material had an acid number of 152.4.

Example 4

Polyester Made from Example 3 Material, Isophthallic Acid, and Bis-hydroxyethyl Terephthalate (BHET)

To a 4 neck round bottom flask equipped with a mechanical stirrer, a packed column, a Dean-Starke trap, a condenser, and a thermocouple connected to a temperature control device, was added 1124.6 parts of the Example 3 material, 482.7 g of isophthallic acid, 1232.5 parts of BHET. The material was heated to 220° C. over the course of 2 hours. After heating for an additional 2.5 hours, the material had an acid number of 23. The difference between the hydroxyl value and the acid number was determined to be 13.4, the theoretical value was 21. To adjust this value, the mixture was cooled to 150° C. and 45.6 parts of BHET were added. The mixture was heated back to 220° C., and held for 2.5 hours. The acid number was determined to be 7.9 and the hydroxyl number was 25.3. The mixture was dumped hot, cooled and broken up.

Example 5

Determination of Oxygen Scavenging 150 parts of the Example 2 polymer was mixed with 1.25 parts of a 6% solution of cobalt neodecanoate in mineral spirits to form an oxygen-scavenging polymer composition ("Example 5A").

9,071 grams of KOSA brand PET (grade 1101E, 0.80+/−0.02 IV PET, available from Invista Corporation) was dried in a CONAIR brand desiccant dryer (dew point ~−40° C.) for 6 hours at a temperature of approximately 130-140° C. After the 6-hour drying time, the PET had a moisture content of less than 50 ppm, as determined by Karl-Fischer. This dried PET was placed in a polyethylene lined, aluminum foil bag. To this bag was added 195 g of the Example 5A mixture. The bag was purged with 100% Nitrogen for 5 minutes, heat-sealed and allowed to tumble/mix for about 25 minutes.

The PET/Example 5A mixture was fed directly into a Husky®, 6-cavity preform injection molder. The injection molder was set for an extrusion temperature of approximately 260-275° C., and had a residence time of approximately 60 seconds. The mixture was molded into PET bottle preforms (weighing 22.0+/−0.5 grams and having 28 millimeter finish), which could be blow molded into formed PET containers. Similarly, bottles comprised of only the KOSA 1101® PET were made for use as negative controls. Several of the preforms made from the neat (100%) PET and PET/Example 5A mixture were blow molded into 20-ounce, carbonated soft drink bottles (CSD). Once blow molded, these bottles were stored in heat sealable aluminum foil bags, which were purged with 100% nitrogen for approximately 5 minutes.

Three bottles for each variable were filled with deionized water and allowed to sit overnight at room temperature. Following this 24-hour water "conditioning," the interiors of the bottles were blown dry with 100% nitrogen. Once dry, the bottles were adhered to a brass plate and tested for oxygen transmission values (i.e. OTR) values using a Mocon (Modern Oxygen Controls Corporation) Ox-Tran 2/61 oxygen analyzer. Once mounted on the brass plate of the Ox-Tran 2/61 oxygen analyzer, the bottles were purged with 100% nitrogen for 12 hours. After 12 hours, the interior atmosphere of the bottle was analyzed for overall oxygen content, and permeability. The results (average of 3 bottles) obtained with the PET/Example 5A mixture were collected and compared to those of the 100% PET control. The results are shown in Table 1 below, with the OTR values reported in cubic centimeters of oxygen transmission per package per day ("cc/pkg/day"). This Table clearly illustrates the utility of the current invention in significantly improving (reducing) the OTR value of PET.

TABLE 1

| Time (hours) | PET/Example 5 Mixture (OTR VALUE - cc/pkg/day) | 100% PET (OTR VALUE - cc/pkg/day) |
|---|---|---|
| 0 | 0.7 | 0.7 |
| 1 | 0.018 | .076 |
| 2 | 0.019 | .076 |
| 3 | 0.018 | .073 |
| 4 | 0.011 | .073 |
| 5 | 0.005 | .072 |
| 6 | 0.003 | .071 |
| 7 | 0.002 | .069 |
| 8 | 0.001 | .068 |
| 9 | 0.001 | .069 |
| 10 | 0.001 | .067 |
| 11 | 0.001 | .066 |
| 12 | 0.001 | .066 |
| 13 | 0.001 | .066 |
| 14 | 0.001 | .067 |
| 15 | 0.001 | .067 |
| 16 | 0.001 | .067 |
| 17 | 0.001 | .067 |
| 18 | 0.002 | .064 |
| 19 | 0.004 | .063 |
| 20 | 0.008 | .063 |

A number of embodiments of the invention have been described. Nevertheless, it will be understood that various modifications may be made without departing from the spirit and scope of the invention. Accordingly, other embodiments are within the scope of the following claims. The complete disclosure of all patents, patent documents, and publications are incorporated herein by reference as if individually incorporated.

What is claimed is:

1. A packaging article including a layer comprising:
    an oxygen-scavenging polymer that includes:
        a base polymer having a backbone that includes at least one heteroatom, wherein the backbone comprises a polyester backbone having one or more aromatic groups, and
        an unsaturated fatty-acid-based side chain attached to the backbone and having two or more carbon-carbon double bonds; and
    an oxidation catalyst;
    wherein the base polymer comprises one or more polyesters, copolyesters, mixtures thereof, or derivatives thereof.

2. The packaging article of claim 1, wherein the oxygen-scavenging polymer has at least one structural unit represented by the schematic formula:

wherein,
-[BACKBONE SEGMENT]- depicts a segment of the backbone;
the —X—Y—Z side chain is formed using as a feedstock a polyunsaturated fatty acid;
X depicts a divalent organic linking group connected to the backbone;
Y depicts a divalent oxygen-scavenging group including two or more carbon-carbon double bonds; and
Z depicts hydrogen or a monovalent organic group.

3. The packaging article of claim 2, wherein X comprises an ester, amide, urethane, ether, urea, carbonate ester, or hydrocarbyl linking group.

4. The packaging article of claim 2, wherein the Y group comprises one of the formulas:

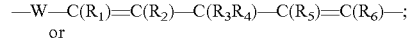

or

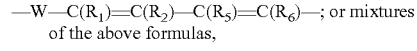

wherein W is optional and, if present, is a divalent organic group and the R groups each denote one of a hydrogen atom, a substituted or unsubstituted alkyl group, a substituted or unsubstituted cycloalkyl group, a substituted or unsubstituted aryl group, or a substituted or unsubstituted alkenyl group.

5. The packaging article of claim 1, wherein the unsaturated fatty-acid-based side chain has a molecular weight from about 67 to 1,000.

6. The packaging article of claim 1, wherein the unsaturated fatty-acid-based side chain is formed using as a feedstock a fatty acid selected from arichidonic, licanic, linolenic, eleostearic, linoleic, or conjugated linoleic acid, or a mixture or combination of these fatty acids.

7. The packaging article of claim 1, wherein the unsaturated fatty-acid-based side chains constitute between 1 and 60 weight percent of the oxygen-scavenging polymer.

8. The packaging article of claim 1, wherein the oxidation catalyst comprises a transition metal, a complex of a transition metal, a photoinitiator or a mixture thereof.

9. The packaging article of claim 1, wherein the oxidation catalyst comprises cobalt, cobalt oxide, cobalt chloride, a cobalt salt of a long chain acid, or a mixture thereof.

10. The packaging article of claim 1, wherein the article comprises a single-layer article.

11. The packaging article of claim 1, wherein the oxygen-scavenging polymer comprises a reaction product of a fatty-acid diol adduct having two or more carbon-carbon double bonds and either (i) a di-acid compound or (ii) a di-isocyanate compound.

12. A packaging article including a layer comprising:
    an oxygen-scavenging polymer that includes:
        a polyester or copolyester base polymer, and
        an unsaturated fatty-acid-based side chain attached to the backbone, wherein the side chain includes two or more carbon-carbon double bonds; and
    an oxidation catalyst comprising cobalt, cobalt oxide, cobalt chloride, a cobalt salt of a long chain acid, or a mixture thereof.

13. The packaging article of claim 12, wherein the unsaturated fatty-acid-based side chains have a molecular weight from about 67 to 1,000 and constitute between 1 and 60 weight percent of the oxygen-scavenging polymer.

14. The packaging article of claim 12, wherein the article comprises a single-layer article selected from a bottle, cup, bowl, container, film, wrap, liner, coating, tray, carton or bag.

15. A packaging article including a layer comprising: an oxygen-scavenging polymer that includes:
   a base polymer having a backbone that includes at least one heteroatom, and
   an unsaturated fatty-acid-based side chain attached to the backbone and having two or more carbon-carbon double bonds; and
   an oxidation catalyst;
   wherein the oxygen-scavenging polymer has at least one structural unit represented by the schematic formula:

wherein,
      -[BACKBONE SEGMENT]- depicts a segment of the backbone;
      the —X-Y-Z side chain is formed using as a feedstock a polyunsaturated fatty acid; X depicts a divalent organic linking group connected to the backbone;
      Y depicts a divalent oxygen-scavenging group including two or more carbon-carbon double bonds; and
      Z depicts hydrogen or a monovalent organic group; and
   wherein the base polymer comprises a polyester or a copolyester, X is an ester linkage, and the —X—Y—Z side chain has a molecular weight of from about 99 to 400.

16. The packaging article of claim 15, wherein the article comprises a single-layer article selected from a bottle, cup, bowl, container, film, wrap, liner, coating, tray, carton or bag.

* * * * *